United States Patent
Karippara et al.

(10) Patent No.: US 9,720,734 B2
(45) Date of Patent: Aug. 1, 2017

(54) MULTI-HOST CONFIGURATION FOR VIRTUAL MACHINE CACHING

(71) Applicant: SanDisk Technologies Inc., Plano, TX (US)

(72) Inventors: Jaidil Karippara, San Ramon, CA (US); Serge Shats, Palo Alto, CA (US); Atoka Vikuto Sema, Fremont, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/925,948

(22) Filed: Oct. 28, 2015

(65) Prior Publication Data

US 2017/0004090 A1    Jan. 5, 2017

Related U.S. Application Data

(60) Provisional application No. 62/187,087, filed on Jun. 30, 2015.

(51) Int. Cl.
*G06F 12/08*     (2016.01)
*G06F 9/50*      (2006.01)
*G06F 12/0888*   (2016.01)

(52) U.S. Cl.
CPC ........... *G06F 9/50* (2013.01); *G06F 12/0888* (2013.01); *G06F 2212/60* (2013.01)

(58) Field of Classification Search
CPC ............ G06F 12/0895; G06F 2212/60; G06F 2212/65
See application file for complete search history.

(56) References Cited

U.S. PATENT DOCUMENTS

2016/0314051 A1* 10/2016 Joshi .................. G06F 11/2069

* cited by examiner

*Primary Examiner* — Yong Choe
(74) *Attorney, Agent, or Firm* — Morgan, Lewis & Bockius LLP

(57) ABSTRACT

Systems and methods disclosed herein are used to efficiently configure a plurality of memory caches. In one aspect, a method includes a server receiving or accessing a storage policy including a first caching mode for a first set of one or more virtual machine elements and a second caching mode for a second set of one or more virtual machine elements. If a virtual machine element requires configuration, the server determines whether the virtual machine element is a virtual machine element of the first set or the second set. If the virtual machine element is a virtual machine element of the first set, the server applies the first caching mode to a section of a logical solid state drive. If the virtual machine element is a virtual machine element of the second set, the server applies the second caching mode to the section of the logical solid state drive.

20 Claims, 5 Drawing Sheets

300

```
┌─────────────────────────────────────────────────────────────────────┐
│ Receive a storage policy including a first caching mode for a first │
│ set of one or more virtual machine elements and a second caching    │
│ mode for a second set of one or more virtual machine elements,      │
│ wherein the one or more virtual machine elements of the first set   │
│ are different from the one or more virtual machine elements of      │
│ the second set                                                      │  ← 302
│  ┌───────────────────────────────────────────────────────────────┐  │
│  │ At least one of the first caching mode or the second caching  │  │  ← 304
│  │                    mode is a write-back mode                  │  │
│  └───────────────────────────────────────────────────────────────┘  │
│  ┌───────────────────────────────────────────────────────────────┐  │
│  │ At least one of the first caching mode or the second caching  │  │  ← 306
│  │                  mode is a write-through mode                 │  │
│  └───────────────────────────────────────────────────────────────┘  │
│  ┌───────────────────────────────────────────────────────────────┐  │
│  │ The storage policy includes a first section size for the      │  │  ← 308
│  │ first set of one or more virtual machine elements and a       │  │
│  │ second section size for the second set of one or more         │  │
│  │ virtual machine elements                                      │  │
│  │  ┌─────────────────────────────────────────────────────────┐  │  │
│  │  │ At least one of the first section size or the second    │  │  │  ← 310
│  │  │ section size is an indication of a number of sections   │  │  │
│  │  └─────────────────────────────────────────────────────────┘  │  │
│  │  ┌─────────────────────────────────────────────────────────┐  │  │
│  │  │ At least one of the first section size or the second    │  │  │  ← 312
│  │  │ section size is an indication of a proportion of        │  │  │
│  │  │ storage size for a logical solid state drive            │  │  │
│  │  └─────────────────────────────────────────────────────────┘  │  │
│  └───────────────────────────────────────────────────────────────┘  │
│  ┌───────────────────────────────────────────────────────────────┐  │
│  │ The storage policy specifies the first caching mode as a      │  │
│  │ default policy for virtual machine elements hosted by a       │  │  ← 314
│  │ first cluster of host computing devices, and further          │  │
│  │ specifies a different caching mode than the first caching     │  │
│  │ mode for a specified set of virtual machine elements hosted   │  │
│  │ by the first cluster of host computing devices.               │  │
│  └───────────────────────────────────────────────────────────────┘  │
└─────────────────────────────────────────────────────────────────────┘
                                   │
                                   ▼
┌─────────────────────────────────────────────────────────────────────┐
│ Determine that a virtual machine element, hosted by a first host    │  ← 316
│              computing device, requires configuration               │
└─────────────────────────────────────────────────────────────────────┘
                                   │
                                   ▼
                                  (A)
```

Figure 3A

MULTI-HOST CONFIGURATION FOR VIRTUAL MACHINE CACHING

RELATED APPLICATIONS

This application claims priority to U.S. Provisional Patent Application No. 62/187,087, filed Jun. 30, 2015, which is hereby incorporated by reference in its entirety.

TECHNICAL FIELD

The disclosed embodiments relate generally to configuration of memory for virtual machines and for networked computing devices hosting virtual machine elements.

BACKGROUND

A virtual machine may utilize flash memory caching for improved efficiency compared with conventional hard drive storage techniques. For example, improvements to efficiency may include increased read speeds, increased storage write speeds, reduced storage input/output (I/O) contention, and reduced storage network traffic. In a system with a large number of devices hosting virtual machines, configuring those virtual machines for caching can be a significant burden on administrators of such systems.

SUMMARY

Without limiting the scope of the appended claims, after considering this disclosure, and particularly after considering the section entitled "Detailed Description" one will understand how the aspects of various embodiments are implemented and used to configure memory caches for devices hosting virtual machine elements. In particular, the embodiments disclosed herein allow a server computer to assign various caching modes to virtual machine elements in accordance with a received policy. In an environment including a large number of virtual machines, the time and labor involved in configuring caching for virtual machine elements may be significantly reduced by a system capable of determining when a virtual element requires configuration (e.g., when a host computing device that hosts the virtual element comes online) and configuring memory for the virtual machine element in accordance with a received policy. Policy-based memory configuration for virtual machine elements allows a system administrator to apply a specific caching mode to a particular set of virtual machine elements.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 3A-3B illustrate flowchart representations of a method of configuring a plurality of memory caches, in accordance with some embodiments.

Figure 1:
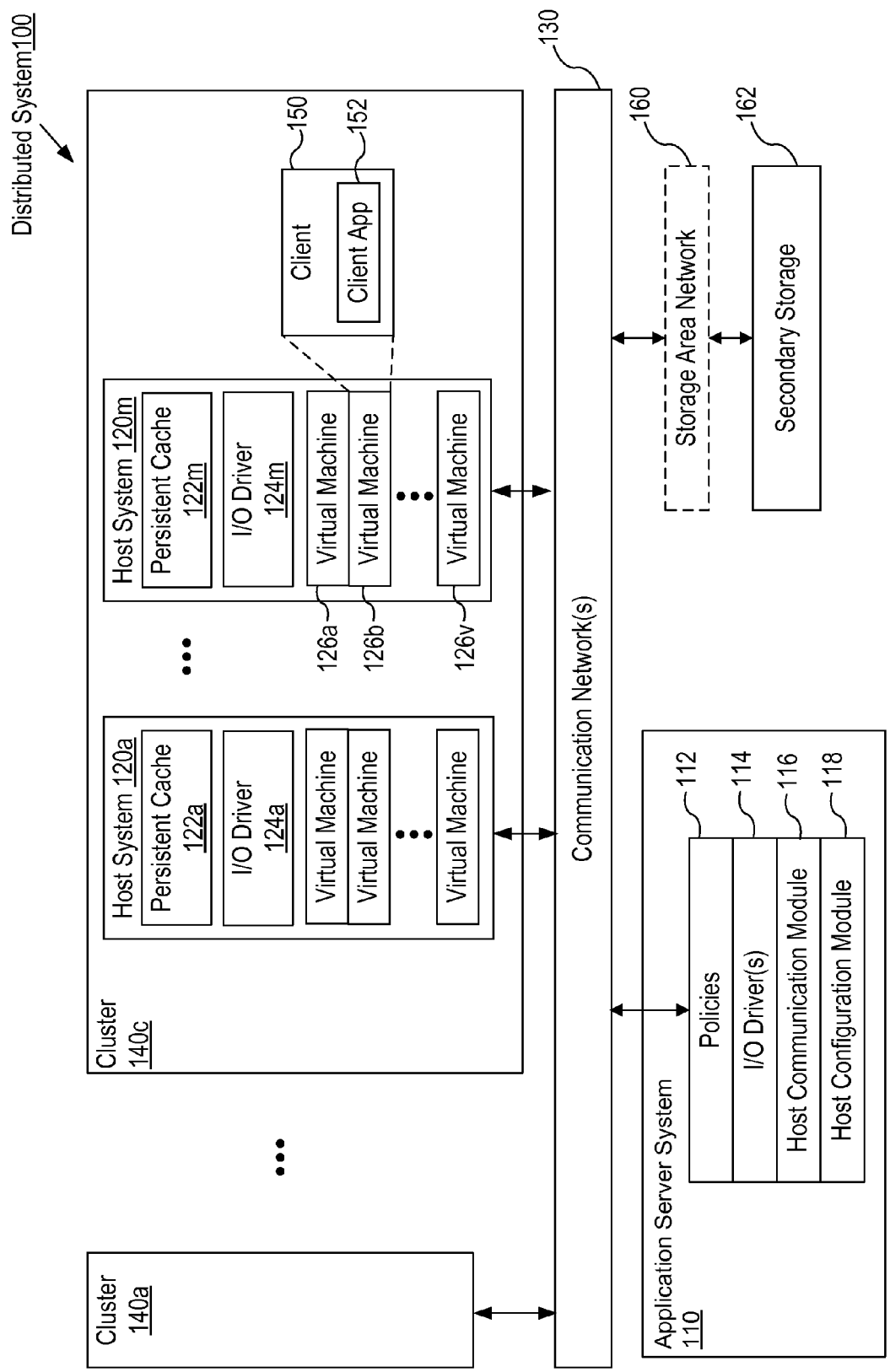
FIG. 1 is a block diagram illustrating an implementation of a distributed system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

This detailed description covers methods and systems for configuring a plurality of memory caches. Other related concepts will also be covered in this detailed description.

(A1) In some embodiments, a method for configuring a plurality of memory caches is performed by a server computing device. The method includes receiving or accessing a storage policy including a first caching mode for a first set of one or more virtual machine elements and a second caching mode for a second set of one or more virtual machine elements. The one or more virtual machine elements of the first set are different from the one or more virtual machine elements of the second set. The method further includes determining that a virtual machine element, hosted by a first host computing device, requires configuration. The method further includes, in response to determining that the virtual machine element requires configuration, determining whether the virtual machine element is a virtual machine element of a the first set of one or more virtual machine elements or the second set of one or more virtual machine elements. The method further includes, in response to determining that the virtual machine element is a virtual machine element of the first set of one or more virtual machine elements, applying the first caching mode to a section of a logical solid state drive associated with the virtual machine element, and in response to determining that the virtual machine element is a virtual machine element of the second set of one or more virtual machine elements, applying the second caching mode to the section of the logical solid state drive associated with the virtual machine element. The server computing device is distinct from the first host computing device that hosts the virtual machine element.

(A2) In some embodiments of the method of A1, at least one of the first caching mode or the second caching mode is a write-back mode.

(A3) In some embodiments of the method of A1 or A2, at least one of the first caching mode or the second caching mode is a write-through mode.

(A4) In some embodiments of the method of any of A1-A3, the storage policy includes (e.g., specifies) a first section size for the first set of one or more virtual machine elements, and a second section size for the second set of one or more virtual machine elements.

(A5) In some embodiments of the method of A4, at least one of the first section size or the second section size is an indication of a number of sections.

(A6) In some embodiments of the method of A4, at least one of the first section size or the second section size is an indication of a proportion of storage size for a logical solid state drive.

(A7) In some embodiments of the method of any of A1-A6, determining that the virtual machine element is a virtual machine element of the first set of one or more virtual machine elements or the second set of one or more virtual machine elements includes determining that identifying information for a virtual machine element matches first information for the first set of one or more virtual machine elements or matches second information for the second set of one or more virtual machine elements.

(A8) In some embodiments of the method of any of A1-A7, the method further includes establishing a host pair between the first host computing device, which hosts the virtual machine element, and a second host computing device that is different from the first host computing device, wherein, in accordance with the established host pair, data cached for the virtual machine element by the first host computing device is also cached by the second host computing device.

(A9) In some embodiments of the method of A8, the method further includes storing identifying information for the first host computing device in association with identifying information for the second host computing device.

(A10) In some embodiments of the method of any of A1-A9, the storage policy specifies the first caching mode as a default policy for virtual machine elements hosted by a first cluster of host computing devices, and further specifies a different caching mode than the first caching mode for a specified set of virtual machine elements hosted by the first cluster of host computing devices.

(A11) In another aspect, a server computing device includes memory, a one or more hardware processors, and one or more modules, stored in said memory and configured for execution by the one or more hardware processors, wherein the one or more modules, when executed by the one or more processors, cause the server computing device to perform the method of any of A1-A10.

(A12) In another aspect, a server computing device includes memory means for receiving or accessing a storage policy including a first caching mode for a first set of one or more virtual machine elements and a second caching mode for a second set of one or more virtual machine elements, wherein the one or more virtual machine elements of the first set are different from the one or more virtual machine elements of the second set. The server computing device further includes means for determining that a virtual machine element, hosted by a first host computing device, requires configuration and means for determining, in response to said determining that the virtual machine element requires configuration, whether the virtual machine element is a virtual machine element of the first set of one or more virtual machine elements or the second set of one or more virtual machine elements. The server computing device further includes means for applying the first caching mode to a section of a logical solid state drive associated with the virtual machine element in response to determining that the virtual machine element is a virtual machine element of the first set of one or more virtual machine elements, and means for applying the second caching mode to the section of the logical solid state drive associated with the virtual machine element in response to determining that the virtual machine element is a virtual machine element of the second set of one or more virtual machine elements. Furthermore, the server computing device is distinct from the first host computing device that hosts the virtual machine element.

(A13) In some embodiments of the server computing device of A12, the server computing device further comprises means for performing the method of any one of A1-A10.

(A14) In yet another aspect, a non-transitory computer-readable storage medium stores one or more programs configured for execution by one or more processors of a server computing device, the one or more programs including instructions for performing the method of any one of A1-A10.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating an implementation of a distributed system 100, in accordance with some embodiments. While some example features are illustrated, various other features have not been illustrated for the sake of brevity and so as not to obscure pertinent aspects of the example embodiments disclosed herein. To that end, as a non-limiting example, distributed system 100 includes an application server system 110 connected to a plurality of host systems 120 (e.g., 120a-120m) through a communication network 130 such as the Internet, other wide area networks, local area networks, metropolitan area networks, wireless networks, or any combination of such networks. In some embodiments, application server system 110 is connected to a plurality of clusters 140 (e.g., 140a-140c) through communication network 130. In some embodiments, a cluster, such as cluster 140c, includes a plurality of host systems, e.g., host systems 120a-120m.

In some embodiments, application server system 110 includes policies 112 (e.g., policies indicating caching modes to be used by one or more sections of a respective persistent cache 122 of a respective host system 120). In some embodiments, application server system 110 receives policies from different computing devices. For example, in some embodiments, a policy created by a system administrator using a graphical user interface executing on a remote computing device may be received by application server system 110 from the remote computing device. In other embodiments, a policy may be created using application server system 110 and/or a default policy may be stored by application server system 110, or accessed by application server system 110 from a predefined location (e.g., a predefined logical location at a remotely located server).

In some embodiments, application server system 110 includes I/O driver(s) 114. In some embodiments, a respective I/O driver 114 is communicated to a respective host system 120 for execution by the respective host system 120, as explained further below. In some embodiments, application server system 110 communicates with host systems 120 using host communication module 116. For example, in some embodiments, host communication module includes instructions for communicating, via communication network 130, a respective I/O driver 114 to a respective host system 120. In some embodiments, application server system 110 includes a host configuration module 118 for configuring one or more sections of a respective persistent cache 122 of a respective host system 120, e.g., in accordance with a respective policy 112.

In some embodiments, a respective host system 120 executes a plurality of virtual machines 126 (e.g., 126a-126v) and includes a respective persistent cache 122 shared by the plurality of virtual machines 126 executed on the respective host system 120. In some embodiments, persistent cache 122 (e.g., 122a-122m) includes non-volatile solid state storage, such as flash memory. In some embodiments, persistent cache 122 is a single flash memory device while in other embodiments persistent cache 122 includes a plurality of flash memory devices. In some embodiments, a persistent cache 122 is a logical solid state drive (LSSD) that provides storage capacity on one or more solid state devices which are accessible as one logical unit. LSSD as used herein may also refer to a solid state drive (SSD). In some embodiments, a flash memory device includes one or more flash memory die, one or more flash memory packages, one or more flash memory channels or the like. In some embodiments, persistent cache 122 is NAND-type flash memory or NOR-type flash memory. In some embodiments, persistent cache 122 includes one or more three-dimensional (3D) memory devices. Further, in some embodiments, persistent cache 122 includes a solid-state drive (SSD) controller. However, other types of storage media e.g., PCRAM, ReRAM, STT-RAM, etc.) may be included in persistent cache 122 in accordance with aspects of a wide variety of embodiments.

In some embodiments, host systems 120 execute I/O drivers 124 (e.g., 124a-124m). A respective host I/O driver 124 may be executed on a respective host system 120 as a daemon (i.e., executed as a background process by an operating system of host system 120) to configure one or more sections of persistent cache 122.

In some implementations, each of the plurality of the virtual machines 126 is a client 150. Each client 150 executes one or more client applications 152 (e.g., a financial application, web application, educational application, etc.) that submit data access commands (e.g., data read and write commands) to the respective host system 120. Furthermore, in some embodiments, an instance of I/O driver 124 executed by the respective host system 120, directs the handling of data access commands by virtual machines hosted by the respective host system 120 in accordance with configuration settings or parameters, including one or more of a caching mode settings or parameters, provided to the respective host system 120 by application server system 110. For example, in some embodiments, the caching mode settings or parameters specify a respective section of a logical solid state drive to use as a cache (for example for caching read or write data and for accessing cached data) for a particular virtual machine element (e.g., a virtual drive), and also specifying a caching mode (e.g., write-through or write-back) to use in conjunction with that particular virtual machine element. Those storage policy settings are provided by application server system 110 to the respective host system 120 so as to configure the I/O driver 124 at the respective host system 120 to handle data caching in accordance with the portion of storage policy 112 applicable to that host system. In some embodiments, the storage policy settings provided by server computing device 110 to the respective host system 120 include a cache mode setting, a caching priority setting, and/or a host pairing setting, each of which is described in more detail below.

In some embodiments, distributed system 100 includes secondary storage 162 connected to host systems 120 via communication network 130. In some embodiments, secondary storage 162 communicates with communication network 130 via storage area network 160. In some embodiments, storage area network 160 obtains and processes data access commands from host systems 120 and returns results to host systems 120. In some embodiments, secondary storage 162 stores data for one or more virtual machine elements (e.g., one or more virtual machines 126 and/or one or more virtual disks of a virtual machine 126) accessible to a client 150 on a respective host system 120. Host systems 120 may use a respective persistent cache 122 for temporary storage and secondary storage 162 for long-term storage. In an illustrative example, when a write-through mode applies to virtual machines of host system 120a, data written to a respective persistent cache 122a may also be written to secondary storage 162 without waiting for the write data to be evicted from the cache or, alternatively, waiting for the cached copy of the write data to be prepared for invalidation. In the illustrative example, when a write-back mode applies to virtual machines of host system 120m, data written to persistent cache 122m is not written to secondary storage 162 until the write data is evicted from persistent cache 122m, or, alternatively, the cached copy of the write data is prepared for invalidation.

Figure 2A:
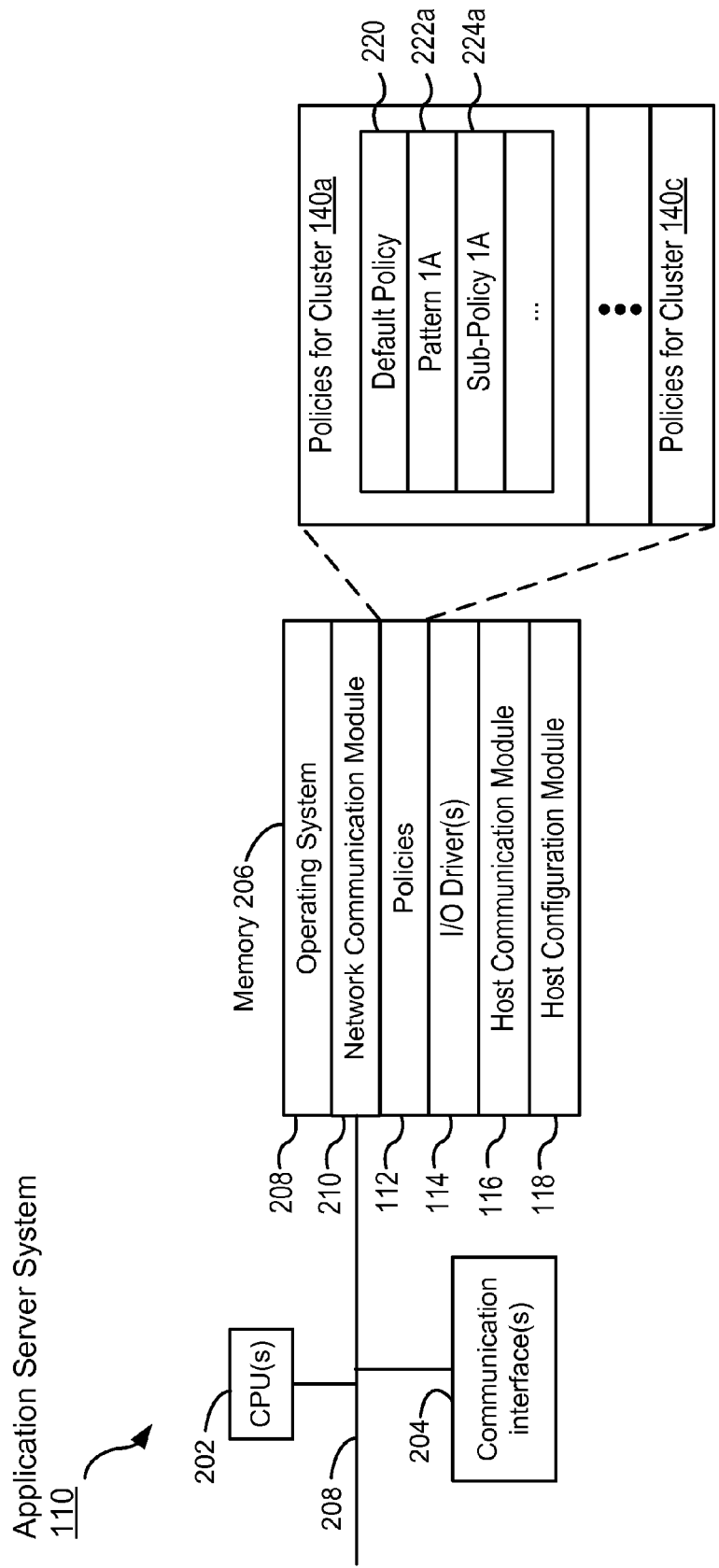
FIG. 2A is a block diagram illustrating an implementation of an application server system, in accordance with some embodiments.

FIG. 2A is a block diagram of application server system 110, which may be implemented using one or more servers. For convenience, the application server system 110 is herein described as implemented using a single server or other computer. Application server system 110 generally includes one or more processing units 202 (sometimes called CPUs or processors or hardware processors), implemented in hardware, for executing modules, programs, and/or instructions stored in memory 206 (and thereby performing processing operations), memory 206, one or more network or other communication interfaces 204, and one or more communication buses 208 for interconnecting these components. The communication buses 208 may include circuitry (sometimes called a chipset) that interconnects and controls communications between system components. Memory 206 includes high speed random access memory and optionally includes non-volatile memory, such as one or more magnetic disk storage devices and/or flash memory devices. Memory 206 optionally includes mass storage that is remotely located from the CPU(s) 202. In some embodiments, memory 206 stores the following programs, modules, and data structures, or a subset thereof:

an operating system 208 that includes procedures for handling various basic system services and for performing hardware independent tasks;

a network communication module 210 that is used for connecting application server system 110 to other computers via the one or more communication network interfaces 204 (wired and/or wireless) and one or more communication networks, such as the Internet, other wide area networks, local area networks, metropolitan area networks, and the like; and policies 112, I/O driver(s) 114, host communication module 116, and host configuration module 118, as described above with reference to FIG. 1.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

In some embodiments, one or more respective policies 112 are created for a plurality of clusters 140, and/or a subset of the plurality of clusters 140, such as an individual cluster (e.g., cluster 140a). For example, application server system 110 may store polices to be applied to one or more host systems 120 of cluster 140a. In this example, default policy 220 specifies a set of policies to be applied to all virtual machines (or other virtual machine elements, such as virtual drives, sometimes called virtual data storage devices or virtual data storage drives) in cluster 140a, except those virtual machines (or virtual machine elements) in cluster 140a for which sub-policies have been specified. This example further specifies a pattern 222, Pattern 1A 222a, and a sub-policy 224, Sub-Policy 1A 224a, where pattern 222a indicates or specifies the virtual machines or virtual machine elements in cluster 140a to which sub-policy 224a applies, and sub-policy 224a specifies a set of policies (e.g., one or more particular policies) for the virtual machine elements whose identified match pattern 222a.

Typically, but not necessarily, at least some policies specified by a respective sub-policy 224 are different from a corresponding policy specified by the default policy 220 for a respective cluster (e.g., cluster 140a). Optionally, the policy for cluster 140a includes one or more additional "pattern and sub-policy" pairs 222/224, in addition to the 222a/224a pair shown in FIG. 2A, where each "pattern and sub-policy" pair includes a respective pattern, specifying a set of virtual machine elements, and a sub-policy, specifying a set of policies (i.e., one or more policies) that apply to the virtual machine elements that match the specified pattern. In some embodiments, a first respective pattern 222 includes identifiers for specific virtual machine elements. In some embodiments, a first or second respective pattern 222 includes one or more wildcard elements (e.g., pattern=VMDemoA??, where the question marks are wildcard elements, each corresponding to any alphanumeric character), and the corresponding sub-policy applies to all virtual machine elements in the cluster that match the pattern.

In some embodiments, default policy 220 specifies a first caching mode, such as write-back mode, that is the default caching mode for virtual machines or virtual machine elements in cluster 140a, while sub-policy 224a specifies a second caching mode, such as write-through mode, for virtual machines or virtual machine elements in cluster 140a whose identifiers match pattern 222a. In some embodiments, virtual machines or virtual machine elements using the write-through mode, when writing data to cache, also write the same data to secondary storage (e.g., hard disk storage devices) without waiting for the write data to be evicted from the cache or, alternatively, waiting for the cached copy of the write data to be prepared for invalidation (which, in some systems is a preparatory operation performed prior to eviction from the cache, and which includes copying the write data from the cache to secondary storage, after which the write data in the cache is no longer "dirty" and is instead considered to be "clean").

In some embodiments, virtual machines or virtual machine elements using the write-back mode, when writing data to cache, do not write the same data to secondary storage (e.g., hard disk storage devices) until the write data is evicted from the cache or, alternatively, the cached copy of the write data is prepared for invalidation (which, in some systems is a preparatory operation performed prior to eviction from the cache, and which includes copying the write data from the cache to secondary storage, after which the write data in the cache is no longer "dirty" and is instead considered to be "clean").

In accordance with this policy specification, application server system 110 configures virtual machines or virtual machine elements in cluster 140a to use the default caching mode, specified by default policy 220, unless their identifier matches the pattern 222 for a sub-policy 224 that specifies a different caching mode. For those virtual machines or virtual machine elements in cluster 140a whose identifiers match the pattern 222 for a sub-policy 224 that specifies the different caching mode, application server system 110 configures those virtual machines or virtual machine elements in cluster 140a to use the different caching mode. More generally, a sub-policy 224 in policies 112 takes precedence over (i.e., overrides) a default policy specified in policies 112, with respect to the cluster for which the default policy and sub-policy are specified. Similarly, if a respective sub-policy 224 includes a sub-sub-policy and a corresponding pattern specified for the sub-sub-policy (not shown in FIG. 2A), the sub-sub-policy would take precedence over (i.e., override) both the default policy for the corresponding cluster and the sub-policy 224 for those virtual machines or virtual machine elements in the corresponding cluster whose identifiers match the pattern specified for the sub-sub-policy.

In some embodiments, application server system 110 stores multiple sets of policies, where each set of policies corresponds to a different set of host systems 120, such as a different cluster 140 of host systems, or a different subset of host systems in a cluster 140. In various embodiments, one or more respective policies 112 are created for a plurality of host systems 120 and/or a subset of the plurality of host systems 120, such as an individual host system (e.g., host system 120m).

Figure 2B:
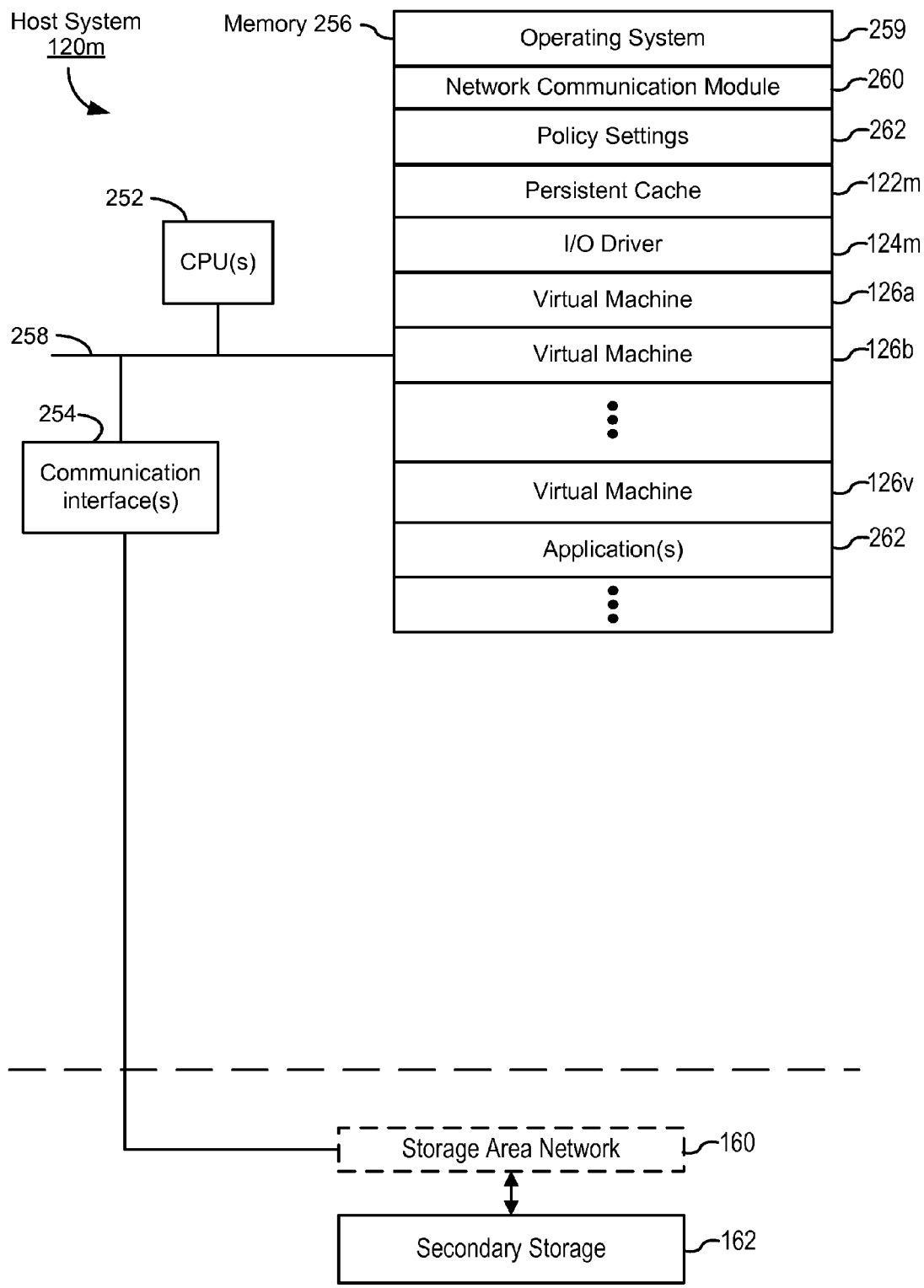
FIG. 2B is a block diagram illustrating an implementation of a host system, in accordance with some embodiments.

FIG. 2B is a block diagram of a host system 120m, which may be implemented using one or more servers. For convenience, the host system 120m is herein described as implemented using a single server or other computer. Host system 120m generally includes one or more processing units 252 (sometimes called CPUs or processors or hardware processors), implemented in hardware, for executing modules, programs, and/or instructions stored in memory 256 (and thereby performing processing operations), memory 256, one or more network or other communication interfaces 254, and one or more communication buses 258 for interconnecting these components. The communication buses 258 may include circuitry (sometimes called a chipset) that interconnects and controls communications between system components. Memory 256 includes high speed random access memory and optionally includes non-volatile memory, such as one or more magnetic disk storage devices and/or flash memory devices. Memory 256 optionally includes mass storage (e.g., secondary storage 152) that is remotely located from the CPU(s) 202. In some embodiments, secondary storage 162 communicates with host system 120m via storage area network 160 and/or communication interface(s) 254. In some embodiments, memory 256 stores the following programs, modules, and data structures, or a subset thereof:

an operating system 259 that includes procedures for handling various basic system services, for performing hardware independent tasks, and for performing procedures defined by I/O Driver 124*m* (such as procedures for applying a respective policy 112 to host system 120*m*);

a network communication module 260 that is used for connecting host system 120*m* to other computers via the one or more communication network interfaces 254 (wired and/or wireless) and one or more communication networks, such as the Internet, other wide area networks, local area networks, metropolitan area networks, and the like;

policy settings 262 that includes one or more policies 112 (FIG. 2A) applicable to host 120*m* (e.g., as applied to host 120*m* by I/O driver 124*m*);

application(s) 262, for example, one or more applications executed by virtual machines 126 hosted by the host system 120*m*;

persistent cache 122*m*, typically implemented as one more solid state drives, or as one or more logical solid state drives, which in turn typically include flash memory devices to store information; and I/O driver 124*m*, and virtual machines 126, as described above with reference to FIG. 1.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 256 may store a subset of the modules and data structures identified above. Furthermore, memory 256 may store additional modules and data structures not described above. In some embodiments, the programs, modules, and data structures stored in memory 256, or the non-transitory computer readable storage medium of memory 256, provide instructions for implementing some of the methods described below. In some embodiments, some or all of these modules may be implemented with specialized hardware circuits that subsume part or all of the module functionality.

Figure 3B:
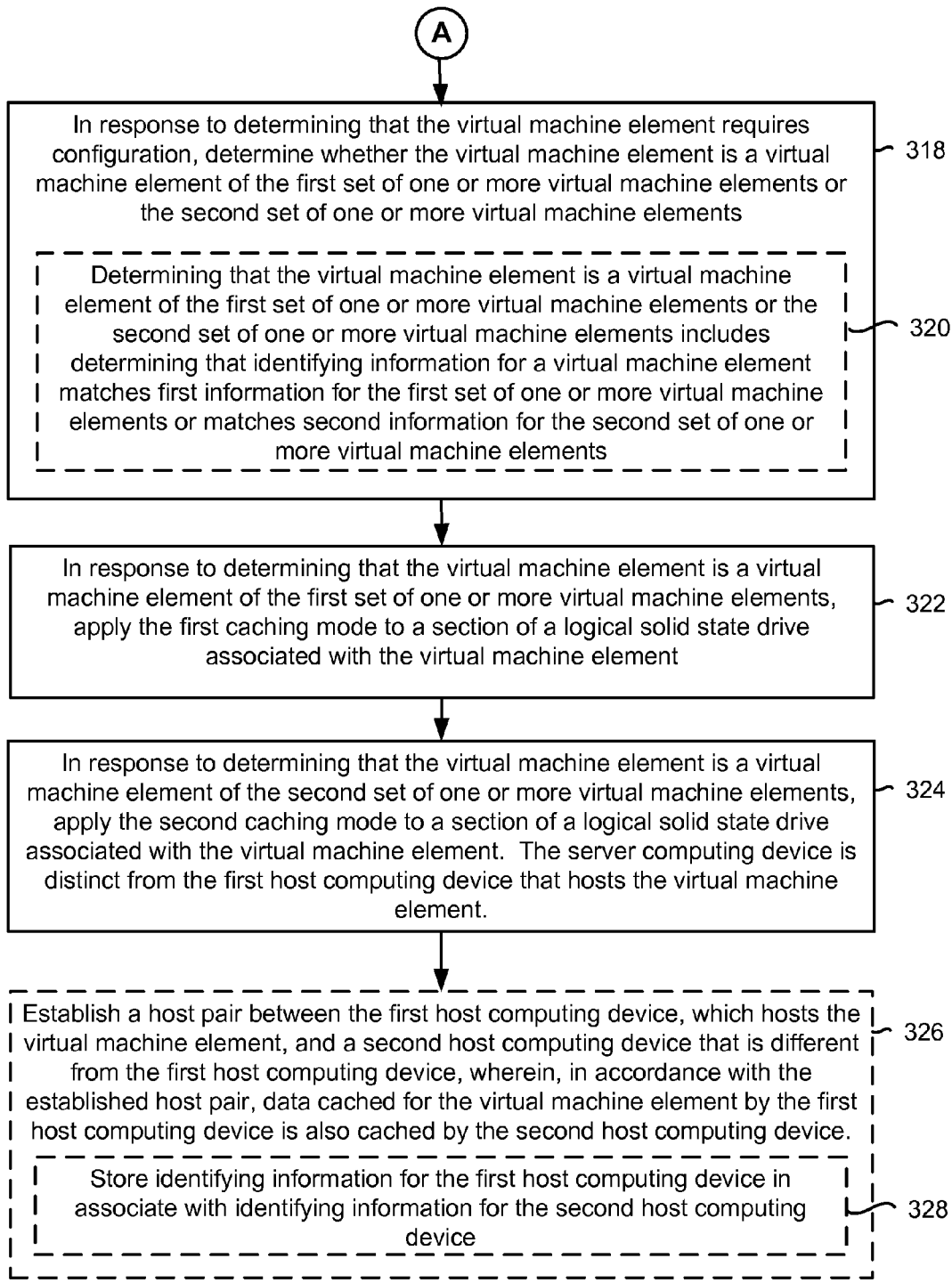

FIGS. 3A-3B illustrate a flowchart representation of a method of configuring a plurality of memory caches, in accordance with some embodiments. With reference to the distributed system 100 pictured in FIG. 1, in some embodiments, a method 300 is performed by a server computing device, e.g., application server system 110. In some embodiments, the method 300 is governed by instructions that are stored in a non-transitory computer-readable storage medium (e.g., memory 206) and that are executed by one or more processors (e.g., hardware processors) of a device, such as the one or more processing units (e.g., CPU(s) 202) (FIG. 2A). For ease of explanation, the following describes method 300 as performed by a server computing device (e.g. application server system 110).

With reference to FIG. 3A, the server computing device receives (302) or accesses a storage policy including a first caching mode for a first set of one or more virtual machine elements and a second caching mode for a second set of one or more virtual machine elements. In some embodiments, a caching mode indicates how a virtual machine element (e.g., of host system 120*a*) caches information to one or more memory cache devices (e.g., persistent cache 122*a*, such as an LSSD). The one or more virtual machine elements of the first set are different from the one or more virtual machine elements of the second set. In some embodiments, a virtual machine element is a virtual machine 126 or a virtual disk of a virtual machine 126. A virtual disk is a virtual storage device that is mapped to one or more physical storage devices (e.g., storage is allocated to a virtual disk from a main memory for host system 120, such as a hard drive of host system 120 and/or a hard drive of a computing system remote from and communicatively coupled to host system 120.) In some embodiments, a virtual machine includes multiple virtual disks. In some embodiments, a set of virtual elements is a set of one or more virtual machines and/or virtual disks of a respective host system 120. In some embodiments, a set of virtual elements is a set of one or more virtual machines and/or virtual disks of a respective cluster 140.

In some embodiments, at least one of the first caching mode or the second caching mode is a write-back mode (304). When a caching mode is a write-back mode, write data is written to cache memory (e.g., persistent cache 122*a*) and completion is confirmed to the host system (e.g., host system 120*a*). Because the only copy of the written data is in the cache (rather than main memory for host system 120), write-back mode potentially reduces latency and increases I/O (input/output) throughput.

In some embodiments, at least one of the first caching mode or the second caching mode is a write-through mode (306). When a caching mode is a write-through mode, write data is written to cache memory (e.g., persistent cache 122*a*) and through to main memory for host system 120 before completion is confirmed to the host system (e.g., host system 120*a*). Typically, latency for write-through mode is greater than latency for write-back mode because of the time consumed by writing data through to main memory. Read I/O performance is improved in write-through mode when reading occurs from cache memory (i.e., when read requests or read operations are satisfied using data already present (i.e., stored or cached) in cache memory).

In some embodiments, the storage policy includes (308) a first section size for the first set of one or more virtual machine elements and a second section size for the second set of one or more virtual machine elements. A section size is, for example, an amount of storage space allocated on a LSSD. Section sizes specified by the storage policy are sometimes herein called caching priority settings. When the virtual machine element is a virtual machine, the amount of storage space allocated to the virtual machine element for caching data corresponds to a caching priority for the virtual machine. When the virtual machine element is a virtual drive, the amount of storage space allocated to the virtual machine element for caching data corresponds to a caching priority for a virtual machine that uses the virtual drive to store or access data.

In some embodiments, at least one of the first section size and the second section size is an indication (310) of a number of sections of a LSSD. A section is, for example, a portion of an LSSD that is defined according to a default storage size (e.g., 16 gigabytes) or that is defined according to a user-indicated storage size. A number of sections is, for example, a default number of sections or a user-defined number of sections. In some embodiments, a section of an LSSD is shared by multiple virtual machine elements (e.g., multiple virtual machines and/or multiple virtual disks of a virtual machine). In an illustrative example, a policy for a first set of one or more virtual machine elements (e.g., all virtual machines 126 of cluster 140*c*) indicates that a section size of persistent cache 122 (e.g., including persistent cache of one or more host systems 120) for each virtual machine is two 16-gigabyte sections of persistent cache 122 and a policy for a second set of one or more virtual machine elements (e.g., all virtual machines of cluster 140*a*) indicates that a section size of persistent cache for each virtual machine is four sections with a minimum section size of 20 gigabytes. In some embodiments, a default number of sections is two sections for each virtual machine with a minimum 16 gigabyte section size, where one of the two sections is used for a write-through caching mode and the other of the two sections is used for a write-back caching mode.

In some embodiments, at least one of the first section size or the second section size is an indication (312) of a proportion of storage size for an LSSD. For example, when establishing a policy, a system administrator can specify a section size for a set of one or more virtual machine elements by specifying a proportion (e.g., a percentage) of total or partial LSSD size, e.g., of an LSSD of a respective host system 120 that hosts the one or more virtual machine elements. A proportion of a storage size for an LSSD is, e.g., a percentage of an LSSD, an amount of available space on an LSSD minus a predefined amount of storage space (e.g., a specific number of megabytes), etc. In various embodiments, a section size is an indication of a proportion of a virtual flash file system (VFFS) size. A VFFS size may be the amount of memory that is usable for caching by a respective host system 120 on an LSSD. For example, a VFFS size may indicate a storage capacity remaining on an LSSD when a portion of the LSSD is occupied by non-cache system data. In some embodiments, a proportion of storage size for an LSSD is indicated as a percentage of available VFFS, an amount of available space on a VFFS minus a predefined amount of storage (e.g., a specific number of megabytes), etc.

In some embodiments, a received storage policy specifies a first caching mode for a first portion of a memory cache (e.g., persistent cache 122a, such as an LSSD) for a first set of one or more virtual machine elements and a second caching mode for a second portion of the memory cache for a second set of one or more virtual machine elements.

In some embodiments, the storage policy specifies (314) the first caching mode as a default policy for virtual machine elements hosted by a first cluster of host computing devices, and further specifies a different caching mode than the first caching mode for a specified set of virtual machine elements hosted by the first cluster of host computing devices. In an illustrative example, a storage policy specifies that write-back mode is a default mode (i.e., a default policy) for virtual machines 126 of cluster 140c and additionally specifies that write-through mode is to be used for virtual machine 126v of cluster 140a.

In some embodiments, the storage policy specifies one or more virtual machine elements that are not be configured automatically in accordance with the storage policy (e.g., that a system administrator will configure manually).

The server computing device determines (316) that a virtual machine element, hosted by a first host computing device (e.g., host system 120a), requires configuration. For example, a host system 120 may be a stateless system that does not store configuration information when the host system 120 goes off-line (e.g., due to a power cycle, power outage, system failure, etc.). In some embodiments, a host system 120 that is a stateless system requires configuration when the host-system goes off-line and returns to being on-line.

In some embodiments, determination that a virtual machine element requires configuration occurs when host systems 120 are initially configured. In some embodiments, a computing device (e.g., application server system 110) performs periodic and/or user-initiated polling to discover new unconfigured host devices that have come on-line (e.g., as a component of a respective cluster 140), previously configured host devices that were previously off-line and have returned to being on-line, etc. In some embodiments, host devices (or at least some host devices in the distributed system 100, FIG. 1) are configured to automatically contact the computing device (e.g., application server system 110) when the host devices come online, for example, as part of a boot sequence or other automatic sequence, thereby causing the computing device to discover that those host devices require configuration. Typically, without regard to how a respective host system is discovered by the computing device, the determination that a virtual machine element requires configuration occurs when a host system 120 hosting the virtual machine element is discovered.

With reference to FIG. 3B, in response to determining that the virtual machine element requires configuration, the server computing device determines (318) whether the virtual machine element is a virtual machine element of the first set of one or more virtual machine elements or the second set of one or more virtual machine elements. For example, the server computing device evaluates the policy to determine how the policy defines the first set of one or more virtual machine elements and the second set of one or more virtual machine elements to determine to which set the virtual machine element belongs. In an illustrative example, a policy indicates that a write-through mode is to be used for virtual machine elements of cluster 140a and a write-through mode is to be used for virtual machine elements of cluster 140c. In the illustrative example, when a host system 120m of cluster 140c is discovered, server computing device determines that a virtual element hosted by host system 120m is a member of a set of one or more virtual machine elements of cluster 140c (e.g., by comparing identifying information of the virtual machine element and/or identifying information of host system 120m with a naming convention, an IP address or IP address pattern, a MAC address and/or other information used to identify sets of one or more virtual machine elements in the policy).

In some embodiments, determining that the virtual machine element is a virtual machine element of the first set of one or more virtual machine elements or the second set of one or more virtual machine elements includes determining (320) that identifying information for a virtual machine element matches first information for the first set of one or more virtual machine elements or matches second information for the second set of one or more virtual machine elements. In some embodiments, a policy may include a list of virtual machine names or indicate a pattern used for virtual machine names. In an illustrative example, identifying information for virtual machines of cluster 140a includes the text "CLUSTER_140A" and identifying information for virtual machines of cluster 140c includes the text "CLUSTER_140C." In the illustrative example, when a host system 120m is discovered, the server computing device determines whether the names of the virtual machines 126 of host system 120m include the text "CLUSTER_140A" or "CLUSTER_140C," and, if the names include the text "CLUSTER_140C," the virtual machines 126 of host system 120m are determined to belong to a set of one or more virtual machine elements to which a policy for cluster 140a is to be applied. In an alternative illustrative example, when identifying information for a host system 120m includes the text "CLUSTER_140C," a virtual machine element of host system 120m is determined to belong to a set of one or more virtual machine elements to which a policy for cluster 140a is to be applied. In some other embodiments, identifying information for virtual machines of a respective cluster 140 includes an IP address matching a pattern or falling within a range of IP addresses specified by the policy for the respective cluster 140.

In some embodiments, determining that the virtual machine element is a virtual machine element of the first set of one or more virtual machine elements or the second set of one or more virtual machine elements includes determining that size information for a virtual machine element matches first information for the first set of one or more virtual machine elements or matches second information for the second set of one or more virtual machine elements. Size information may include, e.g., a particular size, a minimum size, a maximum size, a percentage of available LSSD capacity, etc. In an illustrative example, size information for first set of virtual drives in cluster 140c indicates a minimum size of 256 gigabytes (GB) and a maximum size of 376 GB.

In response to determining that the virtual machine element is a virtual machine element of the first set of one or more virtual machine elements, the server computing device applies (322) the first caching mode to a section of an LSSD associated with the virtual machine element, thereby configuring the caching mode of the virtual machine element. In response to determining that the virtual machine element is a virtual machine element of the second set of one or more virtual machine elements, the server computing device applies (324) the second caching mode to the section of the LSSD associated with the virtual machine element, thereby configuring the caching mode of the virtual machine element. The server computing device (e.g., application server system 110) is distinct from the first host computing device (e.g., host system 120m) that hosts the virtual machine element (e.g., virtual machine 126a).

In some embodiments, the server computing device establishes (326) a host pair between the first host computing device (e.g., host system 120m), which hosts the virtual machine element (e.g., virtual machine 126a), and a second host computing device (e.g., host system 120a) that is different from the first host computing device. In accordance with the established host pair, data cached for the virtual machine element by the first host computing device is also cached by the second host computing device, thereby replicating or mirroring the data cached for the virtual machine element by the first host computing device at the second host computing device. Replicating at a second host computing device data cached for the virtual machine element by the first host computing device is a technique used to maintain data integrity. For example, if a first host computing device goes offline temporarily, a mirrored copy of the data cached by the first host computing device remains available (e.g., to client devices and/or processes) at the second host computing device. In addition, replicated data cached at the second host computing device can be restored to the first host computing device when the first host computing device comes back online In some embodiments, pairing is performed automatically, e.g., by server computing device 110, in accordance with default paring techniques (e.g., a second host computing device is paired with a first host computing device when an IP address for the second host computing device is following and adjacent to the IP address for the first host computing device). In some embodiments, the storage policy received or accessed by server computing device 110 includes one or more "manually" selected pairs of host systems 120, as described next. For example, such techniques are used when devices of host pairs must belong to different racks, when devices of host pairs have different solid state drive types, etc. In an illustrative example, a storage policy received or accessed by server computing device 110 (e.g., a policy generated by a system administrator) provides a name or other identifying information of a first host computing device that is to be paired with a second host computing device. In some embodiments, the storage policy includes information identifying "manually selected" pairs of hosts, where the "manual" aspect of the pairing is from the perspective of the person adding host pairing information or policies to a set of storage policies to be used by server computing device 110. For example, the host pairs may be specified according to a user-defined naming convention (e.g., where hosts having identifiers that match a specified first pattern are paired with hosts having identifiers that match a specified second pattern). In some embodiments, so as to configure host computing systems in accordance with the host pairing aspect of the received or accessed policy, server computing device 110 provides identifying information for the first host computing system of a host pair to the second host computing system of the host pair and/or provides identifying information for the second host computing system of the host pair to the first host computing system of the host pair.

In some embodiments, the server computing device stores (328) identifying information for the first host computing device in association with identifying information for the second host computing device. For example, the server computing device may store, locally or on a remote device, a table (e.g., a database table) that maps, for one or more host pairs, a first host of a host pair to a second host of a host pair. The table may include identifying information (e.g., names, IP addresses, MAC addresses, or the like) of the hosts in each host pair. The mapping may be indicated by a table including a record with identifying information for a first host and a second host.

As noted above, in some embodiments, embodiments, the aforementioned identifying information is included in the storage policy received or accessed by the server computing device. Furthermore, in some embodiments, a default host pairing policy or pattern may be specified in a default policy for a cluster or other grouping of one or more host computer devices, and a different host pairing policy or pattern may be specified in a sub-policy for a specified or identified subset of the host computer devices in the cluster or other grouping of one or more host computer devices.

It will be understood that, although the terms "first," "second," etc. may be used herein to describe various elements, these elements should not be limited by these terms. These terms are only used to distinguish one element from another. For example, a first transistor could be termed a second transistor, and, similarly, a second transistor could be termed a first transistor, without changing the meaning of the description, so long as all occurrences of the "first transistor" are renamed consistently and all occurrences of the "second transistor" are renamed consistently. The first transistor and the second transistor are both transistors, but they are not the same transistor.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, performed by a server computing device, for configuring a plurality of memory caches, the method comprising:
   at the server computing device:
      receiving or accessing a storage policy including a first caching mode for a first set of one or more virtual machine elements and a second caching mode, different from the first caching mode, for a second set of one or more virtual machine elements, wherein:
         the second set of one or more virtual machine elements is different from the first set of one or more virtual machine elements; and
         the storage policy further includes a first section size of non-volatile memory, allocated to virtual machine elements of the first set of one or more virtual machine elements, for caching data, and a second section size of non-volatile memory, allocated to virtual machine elements of the second set of one or more virtual machine elements, for caching data, wherein the second section size is different from the first section size;
      determining that a virtual machine element, hosted by a first host computing device, requires configuration;
      in response to determining that the virtual machine element requires configuration, determining whether the virtual machine element is a virtual machine element of the first set of one or more virtual machine elements or the second set of one or more virtual machine elements;
      in response to determining that the virtual machine element is a virtual machine element of the first set of one or more virtual machine elements, applying the first caching mode to a section of a logical solid state drive associated with the virtual machine element; and
      in response to determining that the virtual machine element is a virtual machine element of the second set of one or more virtual machine elements, applying the second caching mode to the section of the logical solid state drive associated with the virtual machine element;
   wherein the server computing device is distinct from the first host computing device that hosts the virtual machine element.

2. The method of claim 1, wherein at least one of the first caching mode or the second caching mode is a write-back mode.

3. The method of claim 1, wherein at least one of the first caching mode or the second caching mode is a write-through mode.

4. The method of claim 1, wherein at least one of the first section size or the second section size is an indication of a number of sections of non-volatile memory.

5. The method of claim 1, wherein at least one of the first section size or the second section size is an indication of a proportion of storage size for a logical solid state drive.

6. The method of claim 1, wherein determining that the virtual machine element is a virtual machine element of the first set of one or more virtual machine elements or the second set of one or more virtual machine elements includes determining that identifying information for a virtual machine element matches first information for the first set of one or more virtual machine elements or matches second information for the second set of one or more virtual machine elements.

7. The method of claim 1, further comprising:
   establishing a host pair between the first host computing device, which hosts the virtual machine element, and a second host computing device that is different from the first host computing device, wherein, in accordance with the established host pair, data cached for the virtual machine element by the first host computing device is also cached by the second host computing device.

8. The method of claim 7, further comprising storing identifying information for the first host computing device in association with identifying information for the second host computing device.

9. The method of claim 1, wherein the storage policy specifies the first caching mode as a default policy for virtual machine elements hosted by a first cluster of host computing devices, and further specifies a different caching mode than the first caching mode for a specified set of virtual machine elements hosted by the first cluster of host computing devices.

10. A server computing device, comprising:
   memory;
   one or more hardware processors; and
   one or more modules, stored in said memory and configured for execution by the one or more hardware processors, wherein the one or more modules, when executed by the one or more hardware processors, cause the server computing device to:
   receive or access a storage policy including a first caching mode for a first set of one or more virtual machine elements and a second caching mode, different from the first caching mode, for a second set of one or more virtual machine elements, wherein:
      the second set of one or more virtual machine elements is different from the first set of one or more virtual machine elements; and
      the storage policy further includes a first section size of non-volatile memory, allocated to virtual machine elements of the first set of one or more virtual machine elements, for caching data, and a second section size of non-volatile memory, allocated to virtual machine elements of the second set of one or more virtual machine elements, for caching data, wherein the second section size is different from the first section size;

determine that a virtual machine element, hosted by a first host computing device, requires configuration;

in response to determining that the virtual machine element requires configuration, determine whether the virtual machine element is a virtual machine element of the first set of one or more virtual machine elements or the second set of one or more virtual machine elements;

in response to determining that the virtual machine element is a virtual machine element of the first set of one or more virtual machine elements, apply the first caching mode to a section of a logical solid state drive associated with the virtual machine element; and in response to determining that the virtual machine element is a virtual machine element of the second set of one or more virtual machine elements, apply the second caching mode to the section of the logical solid state drive associated with the virtual machine element;

wherein the server computing device is distinct from the first host computing device that hosts the virtual machine element.

11. The server computing device of claim 10, wherein the one or more modules include a host configuration module for configuring one or more sections of a respective logical solid state drive at a respective host system.

12. The server computing device of claim 10, wherein at least one of the first caching mode or the second caching mode is a write-back mode.

13. The server computing device of claim 10, wherein at least one of the first caching mode or the second caching mode is a write-through mode.

14. The server computing device of claim 10, wherein at least one of the first section size or the second section size is an indication of a number of sections of non-volatile memory.

15. The server computing device of claim 10, wherein at least one of the first section size or the second section size is an indication of a proportion of storage size for a logical solid state drive.

16. The server computing device of claim 10, wherein determining that the virtual machine element is a virtual machine element of the first set of one or more virtual machine elements or the second set of one or more virtual machine elements includes determining that identifying information for a virtual machine element matches first information for the first set of one or more virtual machine elements or matches second information for the second set of one or more virtual machine elements.

17. The server computing device of claim 10, wherein the one or more modules, when executed by the one or more hardware processors, further cause the server computing device to:

establish a host pair between the first host computing device, which hosts the virtual machine element, and a second host computing device that is different from the first host computing device, wherein, in accordance with the established host pair, data cached for the virtual machine element by the first host computing device is also cached by the second host computing device.

18. A non-transitory computer-readable storage medium, storing one or more programs configured for execution by one or more processors of a server computing device, the one or more programs including instructions that when executed by the one or more processors cause the server computing device to:

receive or access a storage policy including a first caching mode for a first set of one or more virtual machine elements and a second caching mode, different from the first caching mode, for a second set of one or more virtual machine elements, wherein:

the second set of one or more virtual machine elements is different from the first set of one or more virtual machine elements; and the storage policy further includes a first section size of non-volatile memory, allocated to virtual machine elements of the first set of one or more virtual machine elements, for caching data, and a second section size of non-volatile memory, allocated to virtual machine elements of the second set of one or more virtual machine elements, for caching data, wherein the second section size is different from the first section size;

determine that a virtual machine element, hosted by a first host computing device, requires configuration;

in response to determining that the virtual machine element requires configuration, determine whether the virtual machine element is a virtual machine element of the first set of one or more virtual machine elements or the second set of one or more virtual machine elements;

in response to determining that the virtual machine element is a virtual machine element of the first set of one or more virtual machine elements, apply the first caching mode to a section of a logical solid state drive associated with the virtual machine element; and in response to determining that the virtual machine element is a virtual machine element of the second set of one or more virtual machine elements, apply the second caching mode to the section of the logical solid state drive associated with the virtual machine element;

wherein the server computing device is distinct from the first host computing device that hosts the virtual machine element.

19. The non-transitory computer-readable storage medium of claim 18, wherein:

one of the first caching mode and the second caching mode is a write-back mode; and another one of the first caching mode and the second caching mode is a write-through mode.

20. The non-transitory computer-readable storage medium of claim 18, wherein at least one of the first section size or the second section size is an indication of a number of sections of non-volatile memory.

* * * * *